United States Patent Office 3,393,228
Patented July 16, 1968

3,393,228
HALOGENATED ALKOXY ESTERS AND THEIR PREPARATION
Robert A. Braun, Newark, Del., assignor to E. I. du Pont de Nemours and Company, Wilmington, Del., a corporation of Delaware
No Drawing. Filed Mar. 12, 1965, Ser. No. 439,464
6 Claims. (Cl. 260—484)

ABSTRACT OF THE DISCLOSURE

Fluoro ester compounds of the formula $$RO-\underset{\underset{Y}{|}}{\overset{\overset{O}{\|}}{C}}-\underset{}{\overset{X}{|}}C-OR$$

where X and Y can be perfluoroalkyl radicals of 1 through 5 carbon atoms, and R can be an alkyl radical of 1 through 12 carbon atoms, and a process for making same. These compounds are useful as hydraulic fluids, low temperature lubricants, heat transfer fluids, and as buoyancy and damping fluids.

---

This invention relates to novel fluoro esters. It is more particularly directed to fluoro esters of the formula (1)
$$RO-\underset{\underset{Y}{|}}{\overset{\overset{O}{\|}}{C}}-\underset{}{\overset{X}{|}}C-OR$$

where

X and Y can be perfluoroalkyl radicals of 1 through 5 carbon atoms, $-CFCl_2$ radicals or $-CF_2Cl$ radicals; and R can be an alkyl radical of 1 through 12 carbon atoms or an alkyl radical of 1 through 12 carbon atoms substituted with $-CH=CH_2$ or $-CF_3$.

The compounds of the invention are water-like liquids having a slight ester-like odor. They have a high degree of thermal stability, are water insoluble, insensitive to hydrolysis and are liquid over a wide temperature range. A typical compound, for example, will be liquid from about $-22°$ F. to about $400°$ F. All these properties make the compounds useful as hydraulic fluids, low temperature lubricants, heat transfer fluids and as buoyancy and damping fluids for measuring and recording instruments.

The compounds can be prepared by reacting a halo ketone and an alkyl orthoformate according to the equation (2)
$$2X-\overset{\overset{O}{\|}}{C}-Y + H-\underset{\underset{R}{|}}{\overset{\overset{R}{|}}{C}}-OR \longrightarrow RO-\underset{\underset{Y}{|}}{\overset{\overset{O}{\|}}{C}}-\underset{}{\overset{X}{|}}C-OR + Y-\underset{\underset{X}{|}}{\overset{\overset{OH}{*}}{C}}-OR$$

*The ketone reactants are either available commercially or can be made according to procedures shown in U.S.P. 2,853,524. Those orthoformate reactants which are unavailable commercially can be made by the trans ortho-esterification reaction described in J. Am. Chem. Soc., 77, 3801 (1955) and Ber. 91, 650 (1958).

where R, X and Y are defined as in Formula 1.

Two or more moles of the ketone reactant and one mole of the orthoformate reactant are mixed and placed in a bomb. Because the ketone reactants are liquid, no solvent is ordinarily required for the reaction. Such solvents as benzene and aliphatic hydrocarbons can be used if careful temperature control is required.

The bomb is then heated at 150–250° C. for about six to twenty hours. The resulting liquid is fractionally distilled. The unreacted orthoformate and ketone come off as vapors, leaving behind a residue of a substantially pure compound according to Formula 1. This product can be further purified by another fractional distillation at reduced pressure.

The invention will be more easily understood and readily practiced by referring to the following examples. These examples are intended to be illustrative, and show only representative embodiments of the invention. Those compounds not specifically disclosed can be made by similar methods, varying significantly only in the reactants. In the examples, all parts are by weight.

Example 1

A mixture of 129.0 parts (0.6 mole) of 1,1,3-trichloro trifluoroacetone and 44.4 parts (0.3 mole) of triethylorthoformate was heated in a bomb at 150° C. for six hours.

The resulting material was fractionated on a spinning band column to give 92 parts of unreacted ketone, 22.8 parts of unreacted triethylorthoformate, and 23 parts of a substantially pure compound having the formula $$H_5C_2O-\underset{\underset{CF_2Cl}{|}}{\overset{\overset{O}{\|}}{C}}-\underset{}{\overset{CCl_2F}{|}}C-OC_2H_5$$

This compound was a colorless, water-like liquid having a boiling point of 85° C. at 5 mm. of pressure.

*Analysis.*—Calcd.: C, 30.3; H, 3.2; Cl, 33.5; F, 17.9. Found: C, 29.7; H, 3.3; Cl, 34.1; F, 17.3.

Example 2

A mixture of 129 parts (0.6 mole) of 1,1,3-trichloro trifluoroketone and 31.8 parts (0.3 mole) of trimethylorthoformate was placed in a bomb and heated at 175° C. for eight hours.

This gave 157 parts of a liquid which, upon fractional distillation at atmospheric pressure, gave off a mixture of unreacted orthoformate and unreacted ketone, leaving behind 26 parts of a colorless, water-like liquid which was a substantially pure compound having the structure $$H_3CO-\underset{\underset{CF_2Cl}{|}}{\overset{\overset{O}{\|}}{C}}-\underset{}{\overset{CCl_2F}{|}}C-OCH_3$$

*Analysis.*—Calcd.: C, 24.9; H, 2.1; F, 19.7; Cl, 36.7. Found: C, 24.9; H, 2.1; F, 19.7; Cl, 36.8.

Example 3

1,3-dichlorotetrafluoroacetone (129.4 parts, 0.64 mole) and triethylorthoformate (29.6 parts, 0.2 mole) were thoroughly mixed, placed in a bomb and heated at 175° C. for six hours.

This gave 154 parts of a liquid which, upon fractional distillation, gave off a mixture of the unreacted starting materials, leaving behind 20 parts of a water-like colorless liquid which was a substantially pure compound having the structure $$H_5C_2O-\underset{\underset{CF_2Cl}{|}}{\overset{\overset{O}{\|}}{C}}-\underset{}{\overset{CF_2Cl}{|}}C-OC_2H_5$$

This compound had a boiling point of 170–172° C. and gave the following analysis:

*Analysis.*—Calcd.: C, 33.1; H, 3.6; Cl, 19.5. Found: C, 32.7; H, 3.7; Cl, 20.0.

The following listed orthoformates can be used in place of the triethylorthoformate used in Example 3, in the same molar quantities, to give the corresponding listed products:

| Orthoformate | Product |
|---|---|
| $\text{OCH}_2\text{—CH=CH}_2$ | $\text{O} \quad \text{CF}_2\text{Cl}$ |
| $\text{HC—OCH}_2\text{—CH=CH}_2$ | $\text{H}_2\text{C=CH—CH}_2\text{O—C—C—OCH}_2\text{—CH=CH}_2$ |
| $\text{OCH}_2\text{—CH=CH}_2$ | $\text{CF}_2\text{Cl}$ |
| $\text{OCH}_2\text{CF}_3$ | $\text{O} \quad \text{CF}_2\text{Cl}$ |
| $\text{HC—OCH}_2\text{CF}_3$ | $\text{F}_3\text{C—CH}_2\text{O—C—C—OCH}_2\text{—CF}_3$ |
| $\text{OCH}_2\text{CF}_3$ | $\text{CF}_2\text{Cl}$ |

Similarly, the following ketones can be used in place of the 1,3-dichlorotetrafluoroacetone used in Example 3, in the same molar quantities, to give the corresponding listed products:

| Ketone | Product |
|---|---|
| $\text{CFCl}_2\text{—C(O)—C}_2\text{F}_5$ | $\text{H}_5\text{C}_2\text{O—C(O)—C(CFCl}_2\text{)(C}_2\text{F}_5\text{)—OC}_2\text{H}_5$ |
| $\text{CFCl}_2\text{C(O)—CF}_3$ | $\text{H}_5\text{C}_2\text{O—C(O)—C(CFCl}_2\text{)(CF}_3\text{)—OC}_2\text{H}_5$ |
| $\text{CFCl}_2\text{C(O)—C}_5\text{F}_{11}$ | $\text{H}_5\text{C}_2\text{O—C(O)—C(CFCl}_2\text{)(C}_5\text{F}_{11}\text{)—OC}_2\text{H}_5$ |

Example 4

A mixture of 200 parts (1.2 mole) of hexafluoroacetone and 59.2 parts (0.4 mole) of triethylorthoformate was heated at 250° C. for 6 hours in a bomb.

After the unreacted orthoformate and unreacted ketone were removed by distillation at atmospheric pressure, the residue was fractionally distilled to give 80.0 parts of a colorless liquid, having a boiling point of 143° C. at 760 mm. of pressure and having the structure

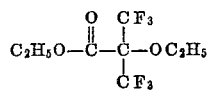

$$\text{C}_2\text{H}_5\text{O—C(O)—C(CF}_3\text{)}_2\text{—OC}_2\text{H}_5$$

*Analysis.*—Calcd.: C, 35.8; H, 3.8; F, 42.5. Found: C, 36.0; H, 4.1; F, 42.7.

The compounds of the invention wherein R is a higher alkyl radical or substituted alkyl radical are made as disclosed in the foregoing examples by merely making appropriate reactant substitutions.

I claim:

1. A compound of the formula

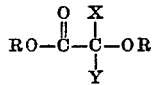

$$\text{RO—C(O)—C(X)(Y)—OR}$$

where

X and Y are selected from the group consisting of perfluoroalkyl radicals of 1 through 5 carbon atoms, —CFCl$_2$ radicals and —CF$_2$Cl radicals; and R is selected from the group consisting of alkyl radicals of 1 through 12 carbon atoms and alkyl radicals of 1 through 12 carbon atoms substituted with a member of the group consisting of —CH=CH$_2$ and —CF$_3$.

2. A compound of the formula

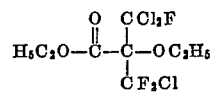

$$\text{H}_5\text{C}_2\text{O—C(O)—C(CCl}_2\text{F)(CF}_2\text{Cl)—OC}_2\text{H}_5$$

3. A compound of the formula

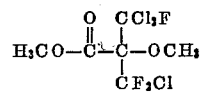

$$\text{H}_3\text{CO—C(O)—C(CCl}_2\text{F)(CF}_2\text{Cl)—OCH}_3$$

4. A compound of the formula

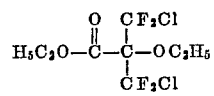

$$\text{H}_5\text{C}_2\text{O—C(O)—C(CF}_2\text{Cl)}_2\text{—OC}_2\text{H}_5$$

5. A compound of the formula

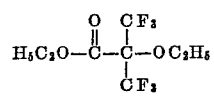

$$\text{H}_5\text{C}_2\text{O—C(O)—C(CF}_3\text{)}_2\text{—OC}_2\text{H}_5$$

6. A process for the preparation of fluoro esters, said process comprising bringing together at least two moles of a fluoroketone of the formula

$$\text{X—C(O)—Y}$$

where X and Y are selected from the group consisting of perfluoroalkyl radicals of 1 through 5 carbon atoms, —CFCl$_2$ radicals and —CF$_2$Cl radicals; and about one mole of an orthoformate of the structure

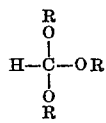

$$\text{H—C(OR)}_3$$

where R is selected from the group consisting of alkyl radicals of 1 through 12 carbon atoms and alkyl radicals of 1 through 12 carbon atoms substituted with a radical selected from the group consisting of —CH=CH$_2$ and —CF$_3$, at a temperature of 100–250° C., for from about 6 to 20 hours, and then recovering the resulting fluoro ester from the reaction mass.

References Cited

UNITED STATES PATENTS

| | | | |
|---|---|---|---|
| 2,713,593 | 7/1955 | Brice et al. | 260—535 |
| 3,113,967 | 12/1963 | Fawcett | 260—544 |
| 3,250,807 | 5/1966 | Fritz et al. | 260—484 XR |
| 3,304,322 | 2/1967 | Mill et al. | 260—535 |

OTHER REFERENCES

Evlampiev, Berichte der Deutschen Chemischen Gesellshaft, vol. 62B, pp. 2386–9.

Pfeiffer et al., J. Am. Chem Soc., vol. 53, pp. 1043–8 (1931).

Post, J. Am. Chem Soc., vol. 55, pp. 4176–7 (1933).

Tatlow, Chem Ab., vol. 49, 2310f (1955).

LORRAINE A. WEINBERGER, *Primary Examiner.*

A. HALLUIN, *Assistant Examiner.*